(12) United States Patent
Takada et al.

(10) Patent No.: US 8,852,801 B2
(45) Date of Patent: Oct. 7, 2014

(54) BATTERY

(75) Inventors: Tomoo Takada, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 359 days.

(21) Appl. No.: 12/956,523

(22) Filed: Nov. 30, 2010

(65) Prior Publication Data

US 2011/0143201 A1 Jun. 16, 2011

(30) Foreign Application Priority Data

Dec. 10, 2009 (JP) .................................. 2009-280752

(51) Int. Cl.
| | |
|---|---|
| *H01M 4/02* | (2006.01) |
| *H01M 4/13* | (2010.01) |
| *H01M 4/64* | (2006.01) |
| *H01M 4/134* | (2010.01) |
| *H01M 10/04* | (2006.01) |
| *H01M 10/0587* | (2010.01) |
| *H01M 10/0525* | (2010.01) |
| *H01M 4/70* | (2006.01) |

(52) U.S. Cl.
CPC .......... *H01M 10/0525* (2013.01); *H01M 4/134* (2013.01); *H01M 10/0436* (2013.01); *Y02E 60/122* (2013.01); *H01M 10/0587* (2013.01); *H01M 4/70* (2013.01)

USPC ........................... 429/211; 429/233; 429/209

(58) Field of Classification Search
USPC ........................................ 429/211, 233, 209
See application file for complete search history.

(56) References Cited

U.S. PATENT DOCUMENTS

2005/0031948 A1* 2/2005 Maeda .......................... 429/164

FOREIGN PATENT DOCUMENTS

| JP | 2005-228537 | 8/2005 |
|---|---|---|
| JP | 2008-034353 | 2/2008 |

* cited by examiner

*Primary Examiner* — Helen O Conley
(74) *Attorney, Agent, or Firm* — Dentons US LLP (57) ABSTRACT

A battery with more superior reliability is provided. The battery includes: a battery element in which a cathode having a cathode active material layer on a strip-shaped cathode current collector and an anode having an anode active material layer on a strip-shaped anode current collector are layered with a separator in between, wherein the anode active material layer is provided to occupy a first region that is overlapped with a cathode active material layer formation region in which the cathode active material layer is provided on the cathode current collector and a peripheral region thereof in the anode, and out of a second region adjacent to the first region in the longitudinal direction in the anode, a width of a third region in which the anode active material layer is not formed and the anode current collector is exposed is smaller than a width of the first region.

7 Claims, 4 Drawing Sheets

BATTERY

BACKGROUND OF THE INVENTION

1. Field of the Invention

The present invention relates to a battery including a battery element in which a cathode and an anode are layered with a separator in between.

2. Description of the Related Art

In recent years, many portable electronic devices such as a combination camera (videotape recorder), a mobile phone, and a notebook personal computer have been introduced, and downsizing and weight saving of such devices have been made. Research and development for improving the energy density of the battery used as a portable power source for such electronic devices, in particular the secondary battery as a key device has been actively promoted. Specially, a nonaqueous electrolyte secondary battery (for example, lithium ion secondary battery) provides a higher energy density compared to a lead battery or a nickel cadmium battery that is an existing aqueous electrolytic solution secondary battery. Therefore, improvement thereof has been considered in respective fields.

For such a secondary battery, improving the energy density associated with miniaturization of an electronic device or the like on which the secondary battery is mounted and improving safety have been strongly demanded. Thus, suggestions about how to improve safety of the secondary battery have been made by approaches from various viewpoints. For example, in Japanese Unexamined Patent Application Publication No. 2005-228537, the width of a current collector in an electrode in a region not covered with an active material layer (exposed region) is narrower than that in a region covered with the active material layer. Thereby, movement (uneven distribution) of an electrolytic solution component is inhibited, and short circuit generated due to collapse of spirally winding state of the battery element is prevented. Further, in Japanese Unexamined Patent Application Publication No. 2008-34353, anode size to a cathode is optimized in a state that a battery is charged. Thereby, lithium ions are reduced in a region other than an anode active material layer, resulting in preventing lowered discharge capacity, short circuit or the like.

SUMMARY OF THE INVENTION

As described above, in the past, various safety improvement measures addressing the high energy density have been proposed, and battery safety has been secured. However, it is prospective that higher energy density of the battery will be achieved in the future. Thus, a measure for safety improvement capable of sufficiently addressing the higher energy density of the battery has been demanded.

In view of the foregoing, in the invention, it is desirable to provide a battery that secures a sufficient capacity and that has high safety reliability.

According to an embodiment of the invention, there is provided a battery including a battery element in which a cathode in which a cathode active material layer is provided on a strip-shaped cathode current collector and an anode having an anode active material layer on a strip-shaped anode current collector are layered with a separator in between. The anode active material layer is provided to occupy a first region that is overlapped with a cathode active material layer formation region in which the cathode active material layer is provided on the cathode current collector and a peripheral region thereof in the anode. Out of a second region adjacent to the first region in the longitudinal direction in the anode, a width of a third region in which the anode active material layer is not formed and the anode current collector is exposed is smaller than a width of the first region.

In the battery of the embodiment of the invention, the anode active material layer is provided to occupy the first region that is opposed to and is overlapped with the cathode active material layer formation region and the peripheral region thereof in the anode. Thus, in charging, current concentration (flow of lithium ions) in an edge in the longitudinal direction of the anode active material layer is relaxed, precipitation of lithium metal in the anode is inhibited, and generation of short circuit is prevented. Further, in the anode, the width of the third region in which the anode current collector is exposed is smaller than the width of the first region that is opposed to and is overlapped with the cathode active material layer formation region. Thus, in case conductive foreign matters such as metal powder are mixed in the battery, generation of short circuit is sufficiently prevented.

According to the battery of the embodiment of the invention, the anode active material layer is provided to sufficiently cover the first region corresponding to the cathode active material region, the width of the third region in which the anode current collector is exposed is smaller than the width of the first region in which the anode active material layer is provided. Thus, generation of internal short circuit associated with charge is able to be sufficiently prevented without damaging the energy density. That is, both securing a sufficient capacity and securing high safety reliability are able to be realized.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings. For each element in the figures, the shape, the size, and the arrangement relation are schematically illustrated to the degree with which the invention is able to be understood, and the shape, the size, and the arrangement relation are different from those actually used.

Figure 1:
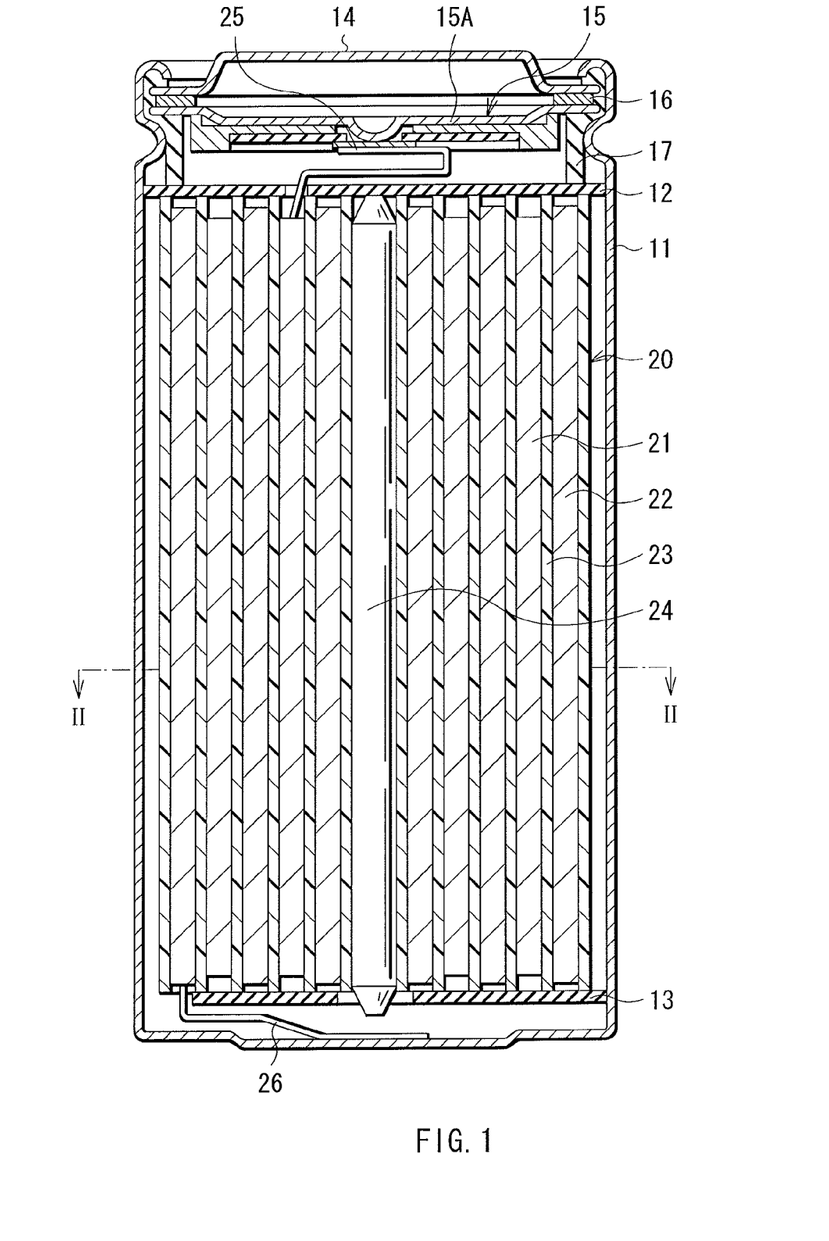
FIG. 1 is a cross sectional view illustrating a secondary battery as an embodiment of the invention.

FIG. 1 illustrates a cross sectional structure of a battery as an embodiment of the invention. The battery is, for example, a lithium ion secondary battery in which the anode capacity is expressed based on insertion and extraction of lithium as an electrode reactant.

Figure 2:
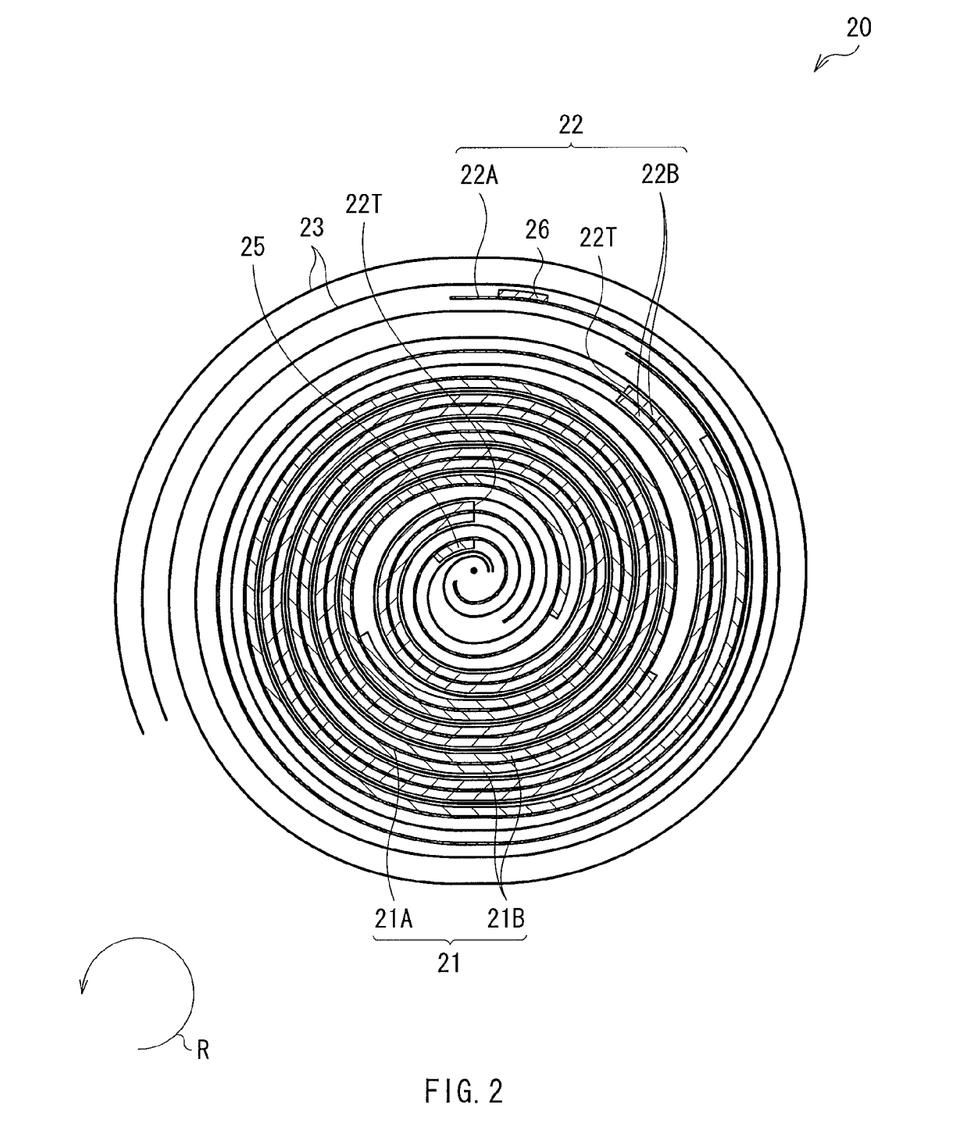
FIG. 2 is a cross sectional view illustrating a structure taken along line II-II of the secondary battery illustrated in FIG. 1.

The secondary battery is a so-called cylinder-type battery, and has a battery element 20 inside a battery can 11 in the shape of an approximately hollow cylinder. FIG. 2 is a cross sectional view taken along line II-II of the battery element 20 illustrated in FIG. 1.

The battery can 11 is made of, for example, iron (Fe) plated by nickel (Ni). One end of the battery can 11 is closed, and the other end thereof is opened. Inside the battery can 11, a pair of insulating plates 12 and 13 is respectively arranged perpendicular to the spirally wound periphery face so that the battery element 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 with the PTC device 16 in between. In the case where the internal pressure of the battery becomes a certain level or more by internal short circuit, external heating or the like, a disk plate 15A flips to cut the electrical connection between the battery cover 14 and the battery element 20. In the case where temperature rises, the PTC device 16 limits a current by increasing the resistance value to prevent abnormal heat generation by a large current. The gasket 17 is made of, for example, an insulating material and the surface thereof is coated with asphalt.

As illustrated in FIG. 2, for example, a center pin 24 is inserted in the center of the battery element 20. The battery element 20 has a laminated structure in which a strip-shaped cathode 21 and a strip-shaped anode 22 are layered with a separator 23 in between. The laminated structure is spirally wound along spirally winding direction R indicated by the arrow from the center side of the spirally wound body to the outer circumference side of the spirally wound body to encircle the center pin 24. FIG. 1 illustrates a simplified laminated structure of the cathode 21 and the anode 22. Further, the spirally winding number of the battery element 20 is not limited to the number illustrated in FIG. 1 and FIG. 2, and is able to be arbitrarily set. In the battery element 20, a cathode lead 25 made of aluminum (Al) or the like is connected to the cathode 21, and an anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 3:
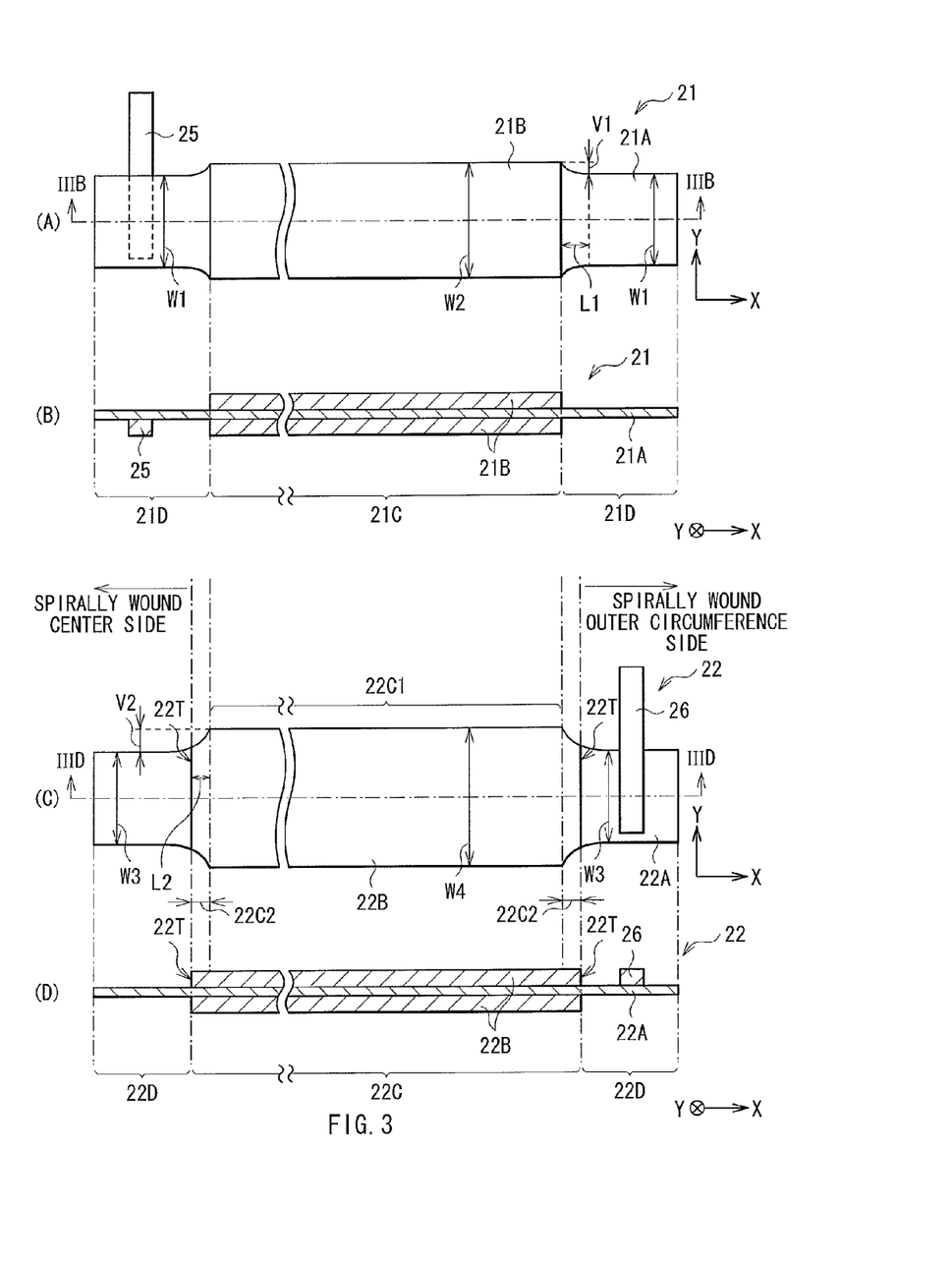
FIG. 3 is plan view and cross sectional view of an exploded cathode and an exploded anode of the secondary battery illustrated in FIG. 1.

Part (A) and part (B) of FIG. 3 illustrate an exploded view of the cathode 21 illustrated in FIG. 1 and FIG. 2. Specifically, part (A) of FIG. 3 is a plan view and part (B) of FIG. 3 is a cross sectional view taken along line IIIB-IIIB of part (A) of FIG. 3. As illustrated in part (A) and part (B) of FIG. 3, the cathode 21 has a structure in which a cathode active material layer 21B is selectively provided on both faces of a strip-shaped cathode current collector 21A extending in X direction. The cathode current collector 21A has a thickness of, for example, about 5 μm to 50 μm both inclusive, and is made of a metal foil such as an aluminum foil, a nickel foil, and a stainless foil.

In the cathode 21, a coated region 21C in which the cathode current collector 21A is coated with the cathode active material layer 21B and a pair of exposed regions 21D in which the cathode current collector 21A is not coated with the cathode active material layer 21B and is exposed are included. The exposed regions 21D are located on both ends in the longitudinal direction of the cathode 21 to sandwich the coated region 21C. For example, the cathode lead 25 is connected to the cathode current collector 21A in the exposed regions 21D on the center side of the spirally wound body. Width W1 of the exposed region 21D is smaller than width W2 of the coated region 21C (W1<W2). That is, in the width direction (Y direction), both edges of the cathode 21 of the exposed region 21D are respectively recessed by distance V1 from both edges of the cathode 21 of the coated region 21C.

Further, the width W1 of the exposed region 21D is preferably decreased continuously as the position thereof is distanced from the coated region 21C in the vicinity of the interface where the exposed region 21D is connected with the coated region 21C for the following reason. In this case, in the vicinity of the interface between the exposed region 21D and the coated region 21C, crack of the cathode current collector 21A due to repeated charge and discharge is less likely to be generated. The vicinity of the interface means a range included in distance L1 from the interface position with the coated region 21C. For example, the distance L1 is equal to the distance V1. Further, in a region other than the vicinity of the interface, the width W1 is desirably constant. The width W2 of the coated region 21C is also desirably constant.

Further, relation between the minimum width W1 of the exposed region 21D and the minimum width W2 of the coated region 21C preferably satisfies the following conditional expression 2. Thereby, generation of internal short circuit is more effectively inhibited, and increase of resistance of the cathode current collector 21A itself is avoided.

$$0.005 \leq (W2-W1)/W2 \leq 0.15 \qquad 2$$

Part (A) and part (B) of FIG illustrate a state that the coated region 21C and the exposed region 21D are provided identically for both faces of the cathode current collector 21A, but state of the cathode 21 is not limited thereto. That is, it is possible that only a single face of the cathode current collector 21A has a region provided with the cathode active material layer 21B.

The cathode active material layer 21B contains, for example, as a cathode active material, one or more cathode materials capable of inserting and extracting lithium as an electrode reactant. The cathode active material layer 21B may contain other material such as a cathode binder and a cathode electrical conductor if necessary.

As the cathode material capable of inserting and extracting lithium, for example, a lithium-containing compound such as a lithium oxide, a lithium sulfide, an interlayer compound containing lithium, and a lithium phosphate compound is suitable. Two or more thereof may be used by mixture. Specially, a complex oxide containing lithium and a transition metal element or a phosphate compound containing lithium and a transition metal element is preferable. In particular, a compound containing at least one of cobalt (Co), nickel, manganese (Mn), iron, aluminum, vanadium (V), and titanium (Ti) as a transition metal element is preferable. The chemical formula thereof is expressed by, for example, $Li_xMIO_2$ or $Li_yMIIPO_4$. In the formula, MI and MII represent one or more transition metal elements. Values of x and y vary according to charge and discharge state of the battery, and are generally in the range of $0.05 \leq x \leq 1.10$ and $0.05 \leq y \leq 1.10$.

Specific examples of the complex oxide containing lithium and a transition metal element include a lithium-cobalt complex oxide ($Li_xCoO_2$), a lithium-nickel complex oxide ($Li_xNiO_2$), a lithium-nickel-cobalt complex oxide ($Li_xNi_{1-z}Co_zO_2(z<1)$), a lithium-nickel-cobalt-manganese complex oxide ($Li_xNi_{(1-v-w)}Co_vMn_wO_2(v+w<1)$), and lithium-manganese complex oxide having a spinel type structure ($LiMn_2O_4$). Specific examples of the phosphate compound containing lithium and a transition metal element include lithium-iron phosphate compound ($LiFePO_4$) and a lithium-iron-manganese phosphate compound ($LiFe_{1-u}Mn_uPO_4$ ($u<1$)).

Examples of the cathode material capable of inserting and extracting lithium include other metal compound and a polymer material. Examples of other metal compound include an oxide such as titanium oxide, vanadium oxide, and manganese dioxide; and a disulfide such as titanium disulfide and molybdenum disulfide. Examples of the polymer material include polyaniline and polythiophene.

It is needless to say that the cathode material capable of inserting and extracting lithium ions may be a material other than the foregoing materials. Further, two or more out of the foregoing cathode materials may be used by mixture arbitrarily.

Examples of the cathode electrical conductor include a carbon material such as graphite, carbon black, acetylene black, and Ketjen black. Such a carbon material may be used singly, or a plurality thereof may be used by mixture. The cathode electrical conductor may be a metal material, a conductive polymer or the like instead of the carbon material as long as the material has the electric conductivity.

Examples of the cathode binder include a synthetic rubber such as styrene-butadiene rubber, fluorinated rubber, and ethylene propylene diene rubber; and a polymer material such as polyvinylidene fluoride. One thereof may be used singly, or a plurality thereof may be used by mixture.

Part (C) and part (D) of FIG. 3 illustrate an exploded view of the anode 22 illustrated in FIG. 1 and FIG. 2. Specifically, part (C) of FIG. 3 is a plan view and part (D) of FIG. 3 is a cross sectional view taken along line IIID-IIID of part (C) of FIG. 3. As illustrated in part (C) and part (D) of FIG. 3, the anode 22 has a structure in which an anode active material layer 22B is selectively provided on both faces of a strip-shaped anode current collector 22A extending in X direction.

In the anode 22, a coated region 22C in which the anode current collector 22A is coated with the anode active material layer 22B and a pair of exposed regions 22D in which the anode current collector 22A is not coated with the anode active material layer 22B and is exposed. The exposed regions 22D are located on both ends in the longitudinal direction of the anode 22 to sandwich the coated region 22C. For example, the anode lead 26 is connected to the anode current collector 22A in the exposed regions 22D on the outer circumference side of the spirally wound body.

The anode active material layer 22B is provided to occupy an opposed region 22C1 that is overlapped with the coated region 21C and a peripheral region 22C2 on the anode current collector 22A. That is, the coated region 22C is a region composed of both the opposed region 22C1 and the peripheral region 22C2. Width W3 of the exposed region 22D is narrower than width W4 of the opposed region 21C1 (W3<W4). That is, in the width direction (Y direction), both edges of the anode 22 of the exposed region 22D are respectively recessed by distance V2 from both edges of the anode 22 of the opposed region 22C1.

Further, the width of the peripheral region 22C2 is preferably decreased continuously as the position thereof is distanced from the opposed region 22C1 to the exposed region 22D for the following reason. In this case, in the vicinity of the interface between the exposed region 22D and the coated region 22C, crack of the anode current collector 22A due to repeated charge and discharge is less likely to be generated. The peripheral region 22C2 is in a range included in distance L2 from the interface position with the coated region 22C. For example, the distance L2 is equal to the distance V2 (difference between the width W4 and the width W3). Further, both the width W3 and the width W4 are desirably constant.

Relation between the width W3 of the exposed region 22D and the width W4 of the opposed region 22C1 preferably satisfies the following conditional expression 1. Thereby, generation of internal short circuit is more effectively inhibited, and increase of resistance of the anode current collector 22A itself is avoided.

$$0.005 \leq (W4 - W3)/W4 \leq 0.15 \qquad 1$$

As described above, the width of the peripheral region 22C2 is desirably decreased as the position thereof is distanced from the opposed region 22C1. However, the width of the peripheral region 22C2 may be equal to that of the opposed region 22C1. In this case, it is preferable that the width W3 of the exposed region 22D is gradually increased as the position thereof becomes close to interface with the coated region 22C in the region in the vicinity of the interface with the coated region 22C. In this case, crack of the anode current collector 22A is less likely to be generated as well. Further, though both widths W3 are desirably equal to each other in the pair of exposed regions 22D, both widths W3 may be different from each other. Further, part (C) and part (D) of FIG. 3 illustrate a state that the coated region 22C and the exposed region 22D are provided identically for both faces of the anode current collector 22A, but state of the anode 22 is not limited thereto. That is, it is possible that only a single face of the anode current collector 22A has a region provided with the anode active material layer 22B.

The anode current collector 22A is desirably made of a metal material having favorable electrochemical stability, electric conductivity, and mechanical strength. Examples of the metal material include copper, nickel, and stainless steel. In particular, copper with superior electric conductivity is more preferable. Further, examples of shape of the anode current collector 22A include a foil, a mesh, and a lath. The surface of the anode current collector 22A is preferably roughened, since thereby contact characteristics between the anode current collector 22A and the anode active material layer 22B are improved by so-called anchor effect. In this case, it is enough that the surface of the anode current collector 22A is roughened in at least the region opposed to the anode active material layer 22B. Examples of method of roughening include a method of forming minute particles by electrolytic treatment. The electrolytic treatment is a method of providing concavity and convexity by forming the minute particles on the surface of the anode current collector 22A by electrolytic method in an electrolytic bath. Copper foils provided with the electrolytic treatment including a copper foil roughened by the foregoing electrolytic treatment are generally called "electrolytic copper foil."

The anode active material layer 22B contains, for example, as an anode active material, an anode material capable of inserting and extracting lithium as an electrode reactant. The anode active material layer 22B may contain an anode electrical conductor and an anode binder similar to those of the cathode active material layer 21B according to needs.

Examples of the anode material capable of inserting and extracting lithium ions include a material that is capable of inserting and extracting lithium ions and has at least one of metal elements and metalloid elements. Such a material is preferably used, since thereby a high energy density is able to be obtained. As such an anode material, a simple substance, an alloy, or a compound of metal elements or metalloid elements, or a material having one or more phases thereof at least in part may be used.

In the invention, "alloys" also include an alloy containing one or more metal elements and one or more metalloid elements, in addition to an alloy composed of two or more metal elements. Further, "alloys" may contain nonmetallic elements. The texture thereof may be a solid solution, a eutectic crystal (eutectic mixture), an intermetallic compound, or a texture in which two or more of the foregoing textures coexist.

Examples of the foregoing metal element or the foregoing metalloid element include a metal element or a metalloid element capable of forming an alloy with lithium. More specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). Specially, at least one of silicon and tin is preferable, and silicon is more preferable, since silicon has high ability to insert and extract lithium ions, and thus is able to provide a high energy density.

Examples of the anode material having at least one of silicon and tin include the simple substance, an alloy, or a compound of silicon; the simple substance, an alloy, or a compound of tin; and a material having one or more phases thereof at least in part. Each thereof may be used singly, or a plurality thereof may be used by mixture.

Examples of the anode material having the simple substance of silicon include a material having the simple substance of silicon as a main body. The anode active material layer 22B containing such an anode material has, for example, a structure in which the second element other than silicon and oxygen exist between silicon simple substance layers. The total content of silicon and oxygen in the anode active material layer 22B is preferably 50 wt % or more, and in particular, the content of the silicon simple substance is preferably 50 wt % or more. Examples of the second element other than silicon include titanium (Ti), chromium (Cr), manganese (Mn), iron, cobalt (Co), nickel, copper, zinc, indium, silver, magnesium, aluminum, germanium, tin, bismuth, and antimony (Sb). The anode active material layer 22B that contains the material having the simple substance of silicon as a main body is able to be formed by co-evaporating silicon and other element.

Examples of the alloy of silicon include a material having at least one selected from the group consisting of tin, nickel, copper, iron, cobalt, manganese, zinc, indium, silver, titanium, germanium, bismuth, antimony, and chromium as the second element other than silicon. Examples of the compound of silicon include a material having oxygen or carbon (C). The compound of silicon may have the foregoing second element in addition to silicon. Examples of the alloy or the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq 2$), and LiSiO.

Examples of the alloy of tin include a material containing at least one selected from the group consisting of silicon, nickel, copper, iron, cobalt, manganese, zinc, indium, silver, titanium, germanium, bismuth, antimony, and chromium as the second element other than tin. Examples of the compound of tin include a compound having oxygen or carbon. The compound of tin may have the foregoing second element in addition to tin. Examples of the alloy or the compound of tin include $SnO_w$ ($0<w\leq 2$), $SnSiO_3$, LiSnO, and $Mg_2Sn$.

In particular, as the anode material having at least one of silicon and tin, for example, a material having the second element and the third element in addition to tin as the first element is preferable. The second element is at least one selected from the group consisting of cobalt, iron, magnesium, titanium, vanadium (V), chromium, manganese, nickel, copper, zinc, gallium, zirconium, niobium (Nb), molybdenum, silver, indium, cerium (Ce), hafnium, tantalum (Ta), tungsten (W), bismuth, and silicon. The third element is at least one selected from the group consisting of boron, carbon, aluminum, and phosphorus (P). In the case where the second element and the third element are contained, cycle characteristics are improved.

Specially, a SnCoC-containing material that has tin, cobalt, and carbon as an element in which the carbon content is from 9.9 wt % to 29.7 wt % both inclusive and the cobalt ratio to the total of tin and cobalt (Co/(Sn+Co)) is from 30 wt % to 70 wt % both inclusive is preferable. In such a composition range, a high energy density is able to be obtained.

The SnCoC-containing material may further have other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby higher effect is able to be obtained.

The SnCoC-containing material has a phase containing tin, cobalt, and carbon. Such a phase is preferably a low crystalline phase or an amorphous phase. The phase is a reaction phase capable of reacting with lithium ions, and thereby superior cycle characteristics are able to be obtained. The half-width of the diffraction peak obtained by X-ray diffraction of the phase is preferably 1.0 degree or more at the diffraction angle 2θ where CuKα ray is used as a specific X ray and trace speed is 1 deg/min. Thereby, lithium ions are more smoothly inserted and extracted, and reactivity with the electrolyte is decreased.

Whether or not the diffraction peak obtained by X-ray diffraction corresponds to the reaction phase capable of being reacted with lithium ions is able to be easily determined by comparison between X-ray diffraction charts before and after electrochemical reaction with lithium ions. For example, in the case where the position of the diffraction peak after electrochemical reaction with lithium ions is changed from the position of the diffraction peak before electrochemical reaction with lithium ions, the obtained diffraction peak corresponds to the reaction phase capable of being reacted with lithium ions. In this case, for example, the diffraction peak of the low crystalline reaction phase or the amorphous reaction phase is shown in the range of 2θ=20 to 50 deg. Such a low crystalline phase or such an amorphous reaction phase contains, for example, the foregoing respective elements, and the low crystalline reaction phase or the amorphous phase may result from existence of carbon mainly.

In some cases, the SnCoC-containing material has a phase containing a simple body or part of the respective elements in addition to the low crystalline phase or the amorphous phase.

In particular, in the SnCoC-containing material, at least part of carbon as an element is preferably bonded to a metal element or a metalloid element as other element. Cohesion or crystallization of tin or the like is thereby inhibited.

Examples of measurement methods of examining bonding state of elements include X-ray Photoelectron Spectroscopy (XPS). XPS is a method in which sample surface is irradiated with soft X ray (using Al—Kα ray or Mg—Kα ray in a commercially available equipment), motion energy of photoelectrons jumping out from the sample surface is measured, and thereby element composition and element bond state in a region within several nm from the sample surface are examined.

Bound energy of inner orbital electron of an element is changed in a correlation with electric charge density on the element first-approximately. For example, in the case where the electric charge density of carbon element is decreased due to interaction with element existing in the vicinity thereof, outer electrons such as 2p electron are decreased, and thus 1s electron of carbon element is subject to strong bound force from the shell. That is, in the case where the electric charge density of element is decreased, bound energy is increased. In XPS, in the case where bound energy is increased, a peak is shifted to a higher energy region.

In XPS, in the case of graphite, the peak of 1s orbit of carbon (C1s) is shown in 284.5 eV in the apparatus in which energy calibration is made so that the peak of 4f orbit of gold atom (Au4f) is obtained in 84.0 eV. In the case of surface contamination carbon, the peak is shown in 284.8 eV. Meanwhile, in the case of higher electric charge density of carbon element, for example, in the case where carbon is bonded to an element that is more positive than carbon, the peak of C1s is shown in the region lower than 284.5 eV. That is, the peak of the composite wave of C1s obtained for the SnCoC-containing material is shown in the region lower than 284.5 eV, in the case where at least part of carbon contained in the SnCoC-containing material is bonded to the metal element or the metalloid element as other element.

In performing XPS measurement, in the case where surface is covered with surface contamination carbon, the surface is preferably sputtered slightly with an argon ion gun belonging to an XPS equipment. Further, in the case where an SnCoC-containing material as a measurement target exists in the anode 22, it is preferable that the secondary battery is disassembled, the anode 22 is taken out, and subsequently the resultant is washed with a volatile solvent such as dimethyl carbonate. Thereby, a low-volatile solvent and an electrolyte salt existing on the surface of the anode 22 are removed. Such sampling is desirably performed under inert atmosphere.

Further, in XPS measurement, for example, the peak of C1s is used for correction of spectrum energy axis. In general, surface contamination carbon exists on the material surface. Thus, the peak of C1s of the surface contamination carbon is regarded as 284.8 eV, which is an energy reference. In XPS measurement, waveform of the peak of C1s is obtained as a form including the peak of the surface contamination carbon and the peak of carbon in the SnCoC-containing material. Thus, for example, by analysis with the use of commercially available software, the peak of the surface contamination carbon is separated from the peak of carbon in the SnCoC-containing material. In waveform analysis, position of the main peak existing on the lowest bound energy side is regarded as energy reference (284.8 eV).

The SnCoC-containing material is able to be formed by, for example, mixing raw materials of each element, dissolving the resultant mixture in an electric furnace, a high frequency induction furnace, an arc melting furnace or the like and subsequently solidifying the resultant. Otherwise, the SnCoC-containing material is able to be formed by various atomization methods such as gas atomizing and water atomizing; various roll methods; or a method using mechanochemical reaction such as mechanical alloying method and mechanical milling method. Specially, the SnCoC-containing material is preferably formed by the method using mechanochemical reaction, since thereby the SnCoC-containing material has a low crystalline structure or an amorphous structure. For the method using the mechanochemical reaction, for example, a manufacturing apparatus such as a planetary ball mill apparatus and an attliter is able to be used.

As a raw material, each simple substance of each element may be used by mixture. As part of elements other than carbon, an alloy is preferably used. By adding carbon to such an alloy and synthesis is made by a method using mechanical alloying method, a low crystalline structure or an amorphous structure is able to be obtained, and reaction time is shortened. Form of the raw material may be powder or a mass.

In addition to the SnCoC-containing material, a SnCoFeC-containing material having tin, cobalt, iron, and carbon as an element is also preferable. The composition of the SnCoFeC-containing material is able to be arbitrarily set. For example, as a composition in which the iron content is set small, it is preferable that the carbon content is from 9.9 wt % to 29.7 wt % both inclusive, the iron content is from 0.3 wt % to 5.9 wt % both inclusive, and the cobalt ratio to the total of tin and cobalt (Co/(Sn+Co)) is from 30 wt % to 70 wt % both inclusive. Further, for example, as a composition in which the iron content is set large, it is preferable that the carbon content is from 11.9 wt % to 29.7 wt % both inclusive, the ratio of the total of cobalt and iron to the total of tin, cobalt, and iron ((Co+Fe)/(Sn+Co+Fe)) is from 26.4 wt % to 48.5 wt % both inclusive, and the cobalt ratio to the total of cobalt and iron (Co/(Co+Fe)) is from 9.9 wt % to 79.5 wt % both inclusive. In such a composition range, a high energy density is obtained. The crystallinity of the SnCoFeC-containing material, the measurement method of bonding state of elements, the forming method of the SnCoFeC-containing material and the like are similar to those of the foregoing SnCoC-containing material.

The anode active material layer 22B using the simple substance, an alloy, or a compound of silicon; the simple substance, an alloy, or a compound of tin; and a material having one or more phases thereof at least in part as the anode material capable of inserting and extracting lithium ions is formed by using, for example, vapor-phase deposition method, liquid-phase deposition method, spraying method, coating method, firing method, or a combination of two or more of these methods. In this case, the anode current collector 22A and the anode active material layer 22B are preferably alloyed in at least part of the interface thereof More specifically, at the interface thereof, the element of the anode current collector 22A may be diffused in the anode active material layer 22B; or the element of the anode active material layer 22B may be diffused in the anode current collector 22A; or these elements may be diffused in each other. Thereby, destruction due to expansion and shrinkage of the anode active material layer 22B associated with charge and discharge is inhibited, and the electron conductivity between the anode current collector 22A and the anode active material layer 22B is improved.

Examples of vapor-phase deposition method include physical deposition method and chemical deposition method. Specific examples thereof include vacuum evaporation method, sputtering method, ion plating method, laser ablation method, thermal Chemical Vapor Deposition (CVD) method, and plasma CVD method. As liquid-phase deposition method, a known technique such as electrolytic plating and electroless plating is able to be used. Coating method is, for example, a method in which a particulate anode active material mixed with a binder or the like is dispersed in a solvent and the anode current collector is coated with the resultant. Firing method is, for example, after performing coating by coating method, heat treatment is provided at temperature higher than the melting point of the binder or the like. For firing method, a known technique such as atmosphere firing method, reactive firing method, and hot press firing method is available.

In addition to the foregoing, examples of the anode material capable of inserting and extracting lithium ions include a carbon material. Examples of the carbon material include graphitizable carbon, non-graphitizable carbon in which the plane distance of (002) plane is 0.37 nm or more, graphite in which the plane distance of (002) plane is 0.34 nm or less. More specific examples thereof include pyrolytic carbons, coke, glassy carbon fiber, an organic polymer compound fired body, activated carbon, and carbon black. Of the foregoing, the coke includes pitch coke, needle coke, petroleum coke and the like. The organic polymer compound fired body is obtained by firing and carbonizing a phenol resin, a furan resin or the like at appropriate temperature. In the carbon material, the crystal structure change associated with inserting and extracting lithium ions is very little. Therefore, by using the carbon material, a high energy density is able to be obtained and superior cycle characteristics are able to be obtained. In addition, the carbon material also functions as an electrical conductor, and thus the carbon material is preferably used. The shape of the carbon material may be any of a fibrous shape, a spherical shape, a granular shape, and a scale-like shape.

Further, examples of the anode material capable of inserting and extracting lithium ions include a metal oxide and a polymer compound capable of inserting and extracting lithium ions. Examples of the metal oxide include iron oxide, ruthenium oxide, and molybdenum oxide. Examples of the polymer compound include polyacetylene, polyaniline, and polypyrrole.

It is needless to say that the anode material capable of inserting and extracting lithium ions may be a material other than the foregoing compounds. Further, two or more of the foregoing anode materials may be used by mixture arbitrarily.

The anode active material made of the foregoing anode material is composed of, for example, a plurality of particles. That is, the anode active materiel layer 22B has a plurality of anode active material particles. The anode active material particles are formed by, for example, the foregoing vapor-phase deposition method or the like. However, the anode active material particles may be formed by a method other than vapor-phase deposition method.

In the case where the anode active material particles are formed by deposition method such as vapor-phase deposition method, the anode active material particles may have a single layer structure formed by a single deposition step or may have a multilayer structure formed by a plurality of deposition steps. However, in the case where the anode active material particles are formed by evaporation method or the like associated with high heat at the time of deposition, the anode active material particles preferably have a multilayer structure. In this case, the deposition step of the anode material is divided into several steps (a plurality of thin layers of the anode material are sequentially formed and deposited), time that the anode current collector 22A is exposed at high heat is shortened compared to a case that the deposition is performed in a single deposition step. Thereby, the anode current collector 22A is hardly subject to thermal damage.

The anode active material particles are grown, for example, in the thickness direction of the anode active material layer 22B from the surface of the anode current collector 22A, and the anode active material particles are linked to the anode current collector 22A at the root thereof. In this case, it is preferable that the anode active material particles are formed by vapor-phase deposition method, and at least part of the interface with the anode current collector 22A is alloyed as described above. More specifically, at the interface in between, the element of the anode current collector 22A may be diffused in the anode active material particles; or the element of the anode active material particles may be diffused in the anode current collector 22A; or the respective elements may be diffused in each other.

In particular, the anode active material layer 22B preferably has an oxide-containing film to cover the surface of the anode active material particles (region to be contacted with the electrolyte). In this case, the oxide-containing film functions as a protective film for the electrolyte, and accordingly decomposition reaction of the electrolyte is inhibited even if charge and discharge are repeated. Thereby, the cycle characteristics are improved. The oxide-containing film may cover part of surface of the anode active material particles, or may cover the entire surface thereof.

The oxide-containing film contains, for example, at least one oxide selected from the group consisting of a silicon oxide, a germanium oxide, and a tin oxide. Specially, the oxide-containing film preferably contains the silicon oxide, since thereby the oxide-containing film easily covers the entire surface of the anode active material particles, and superior protective action is thereby obtained. It is needless to say that the oxide-containing film may contain an oxide other than the foregoing oxides. The oxide-containing film is formed by, for example, vapor-phase deposition method or liquid-phase deposition method. Specially, the oxide-containing film is preferably formed by liquid-phase deposition method such as liquid-phase precipitation method, sol gel method, coating method, and dip coating method. Specially, liquid-phase precipitation method is more preferable, since thereby the oxide-containing film easily covers a wide range of the surface of the anode active material particles.

Further, the anode active material layer 22B preferably has a metal material not being alloyed with lithium in a gap between the anode active material particles and a gap inside the anode active material particles. Thereby, the plurality of anode active material particles are bound to each other with the metal material in between. In addition, since the metal material exists in the foregoing gap, expansion and shrinkage of the anode active material layer 22B are inhibited. Thereby, the cycle characteristics are improved.

The metal material has, for example, a metal element not being alloyed with lithium as an element. Examples of the foregoing metal elements include at least one selected from the group consisting of iron, cobalt, nickel, zinc, and copper. Specially, cobalt is preferable, since thereby the metal material easily intrudes into the foregoing gap, and superior binding action is able to be obtained. It is needless to say that the metal material may have a metal element other than the foregoing metal elements. However, "metal material" herein is a comprehensive term, including not only a simple substance but also an alloy and a metal compound. The metal material is formed by, for example, vapor-phase deposition method, liquid-phase deposition method or the like. Specially, the metal material is preferably formed by liquid-phase deposition method such as electrolytic plating method and non-electrolytic plating method. Specially, electrolytic plating method is more preferable, since thereby the metal material more easily intrudes into the foregoing gap, and the formation time thereof is shortened.

The anode active material layer 22B may have only one of the foregoing oxide-containing film and the foregoing metal material, or may have both thereof. However, in order to further improve the cycle characteristics, the anode active material layer 22B preferably contains both thereof.

The separator 23 is a member that separates the cathode 21 from the anode 22, prevents current short circuit due to contact of both electrodes, and enables movement of lithium ions between the electrodes. The separator 23 is made of, for example, a porous film made of a polyolefin material such as polypropylene and polyethylene, polytetrafluoroethylene, or a synthetic resin such as aramid; or a porous film made of an inorganic material such as a ceramics nonwoven cloth. The separator 23 may have a structure in which two or more of the foregoing porous films are layered. Further, the porous film may be coated with a resin such as polyvinylidene fluoride and vinylidene fluoride-hexafluoropropylene copolymer; rubber, or a mixture thereof. Otherwise, the foregoing porous film may be coated with a resin or rubber in which a material with relatively large heat capacity such as aluminum oxide is mixed.

An electrolytic solution as a liquid electrolyte is impregnated in the separator 23. The electrolytic solution contains, for example, a solvent and a lithium salt as an electrolyte salt. The solvent dissolves and dissociates the electrolyte salt.

As the solvent, for example, one of various materials shown in the following 1 to 10 or a mixture obtained by mixing two or more thereof arbitrarily is suitable.

1. Cyclic Carbonate and Fluorine-Containing Cyclic Carbonate

Specific examples thereof are as follows:
4-methyl-1,3-dioxolane-2-one, 1,3-dioxolane2-one, 4-fluoro-1,3-dioxolane-2-one,
4,5-difluoro-1,3-dioxolane-2-one, 4,4,5-trifluoro-1,3-dioxolane-2-one,
4,4,5,5-tetrafluoro-1,3-dioxolane-2-one, 4-trifluoromethyl-1,3-dioxolane-2-one,
4-difluoromethyl-1,3-dioxolane-2-one, diphenyl carbonate, and butylene carbonate.

2. Dialkyl Carbonate and Fluorine-Containing Chain Carbonate

Specific examples thereof are as follows:
dimethyl carbonate, diethyl carbonate, methylethyl carbonate, di-iso-propyl carbonate, di-n-propyl carbonate, di-n-butyl carbonate, di-tert-butyl carbonate, monofluoromethylmethyl carbonate, ethyl(2-fluoroethyl) carbonate, methyl(2-fluoro)ethyl carbonate, bis(2-fluoroethyl)carbonate, and fluoropropyl methyl carbonate.

3. Cyclic Ester

Specific examples thereof are as follows:
γ-butyrolactone and γ-valerolactone

4. Chain Ester

Specific examples thereof are as follows:
methyl acetate, ethyl acetate, propyl acetate, methyl propionate, and ethyl propionate 5. Cyclic Ether Specific examples thereof are as follows:
tetrahydrofuran, 2-methyltetrahydrofuran, tetrahydropyran, 1,3-dioxolane, 4-methyl-1,3-dioxolane, 1,3-dioxane, 4-metyl-1,3-dioxane, and 1,3-benzodioxole 6. Cyclic Ether Specific examples thereof are as follows:
1,2-dimethoxyethane, 1,2-diethoxyethane, diglyme, triglyme, tetraglyme, and diethylether 7. Sulfur-Containing Organic Solvent Specific examples thereof are as follows:
ethylene sulfite, propane sultone, sulfolane, methylsulfolane, and diethylsulfine 8. Nitrile Specific examples thereof are as follows:
acetonitrile and propionitrile 9. Carbamate Specific examples thereof are as follows:
N,N'-dimethylcarbamate and N,N'-diethylcarbamate 10. Unsaturated Bond-Containing Carbonate Specific examples thereof are as follows:
vinylene carbonate, 4,5-diphenylvinylene carbonate, vinylethylene carbonate, arylmethyl carbonate, and diaryl carbonate Specially, a low viscosity solvent with viscosity of 1 mPa·s or less such as dimethyl carbonate, diethyl carbonate, and methylethyl carbonate and a high dielectric constant solvent such as 1,3-dioxolane-2-one and 4-methyl-1,3-dioxolane-2-one are preferably used by mixture. Thereby, higher ion conductivity is able to be obtained. Further, a compound contributing to safety such as an aromatic compound such as biphenyl, cyclohexyl benzene, terphenyl, and fluorobenzene and an anisole compound; an ionic liquid; phosphazene; ester phosphate having combustion effect such as trimethyl phosphate, triethyl phosphate, 2,2,2-trifluoroethyl phosphate, triphenyl phosphate, and tritolyl phosphate and the like may be mixed therein.

Examples of the lithium salt include $LiPF_6$, $LiBF_4$, $LiClO_4$, $LiAsF_6$, $LiSbF_6$, $CF_3SO_3Li$, $(CF_3SO_2)_2NLi$, $(CF_3SO_2)_3CLi$, $(C_2F_5SO_2)_2NLi$, LiCl, LiBr, LiI, $LiB(C_6H_5)_4$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, $LiB(C_2O_4)_2$, and fluoro[oxolato-O, O']lithium borate (abbreviated to $LiBF_2(Ox)$). One of the foregoing lithium salts may be used, or two or more thereof may be used by mixture. The concentration of the electrolyte in the electrolytic solution is preferably from 0.1 mol/kg to 3 mol/kg both inclusive, and is in particular preferably from 0.5 mol/kg to 1.5 mol/kg both inclusive.

In the secondary battery, in charging, for example, lithium ions are extracted from the cathode 21 and inserted in the anode 22 through the electrolytic solution impregnated in the separator 23. Meanwhile, in discharging, for example, lithium ions are extracted from the anode 22 and inserted in the cathode 21 through the electrolytic solution impregnated in the separator 23.

The cylinder-type secondary battery is manufactured, for example, by the following procedure.

First, the cathode 21 is formed by forming the cathode active material layer 21B on the surface of the strip-shaped cathode current collector 21A. Specifically, a cathode active material, an electrical conductor, and a binder are mixed to prepare a cathode mixture, which is dispersed in a solvent such as N-methyl-2-pyrrolidone to form paste cathode mixture slurry. Examples of solvent to obtain the cathode mixture slurry include N-methylpyrrolidone, dimethylformamide, dimethylacetoamide, methylethylketone, cyclohexanone, methyl acetate, methyl acrylate, diethyltriamine, N—N-dimethyl aminopropylamine, ethylene oxide, and tetrahydrofuran in addition to N-methyl-2-pyrrolidone. Further, it is possible that a disperser, a thickener and the like are added to water, and the cathode active material is slurried with latex such as SBR. Subsequently, the cathode current collector 21A is coated with the cathode mixture slurry to obtain a uniform thickness by using a doctor blade, a bar coater or the like. After the resultant is dried, the resultant is compression-molded by a rolling press machine or the like according to needs to form the cathode active material layer 21B. At this time, the cathode active material layer 21B is formed only in a given region of the cathode current collector 21A (region to become the coated region 21C), and thereby the coated region 21C and the exposed region 21D are provided. Further, both ends in the width direction of the exposed region 21D are cut and removed, the width W1 of the exposed region 21D is formed smaller than the width W2 of the coated region 21C, and thereby the cathode 21 is obtained.

Next, the anode 22 is formed. First, the strip-shaped anode current collector 22A made of a roughened electrolytic copper foil or the like is prepared. After that, the anode material is deposited on both faces of the anode current collector 22A by vapor-phase deposition method such as evaporation method to form the plurality of anode active material particles. Subsequently, according to needs, the oxide-containing film is formed by liquid phase deposition method such as liquid phase precipitation method, or the metal material is formed by liquid phase deposition method such as electrolytic plating method to form the anode active material layer 22B. Otherwise, an anode active material and a binder are mixed to prepare an anode mixture, which is dispersed in an organic solvent to form paste anode mixture slurry. After that, a given region in the anode current collector 22A (region to become the coated region 22C) is coated with the anode mixture slurry. After the resultant is dried, the resultant is compression-molded, and thereby the anode active material layer 22B is formed. In the case where the anode active material layer 22B is formed from an anode active material containing silicon, tin, or lithium, it is desirable to provide compression molding or annealing treatment according to needs in order to improve contact characteristics between the anode current collector 22A and the anode active material layer 22B. Thereby, peeling of the anode active material layer 22B from the anode current collector 22A is inhibited, and favorable cycle characteristics are able to be obtained. In the anode 22, the anode active material layer 22B is selectively formed on the anode current collector 22A as well, and thereby the coated region 22C and the exposed region 22D are provided. Further, both ends in the width direction of the peripheral region 22C2 and the exposed region 22D are cut and removed, the width W3 of the peripheral region 22C2 and the exposed region 22D is formed smaller than the width W4 of the coated region 22C, and thereby the anode 22 is obtained.

Next, the cathode lead 25 and the anode lead 26 are respectively attached to a given position of the cathode current collector 21A and the anode current collector 22A by welding or the like. After that, the cathode 21 and the anode 22 are layered with the separator 23 in between, and are spirally wound several times in the spirally winding direction R illustrated in FIG. 2 to obtain the battery element 20. In layering the cathode 21 and the anode 22, the coated region 22C of the anode 22 is layered on all area of the coated region 21C of the cathode 21.

After the battery element 20 is formed, the center pin 24 is inserted in the center of the spirally wound body. Subsequently, while the battery element 20 is sandwiched between the pair of insulating plates 12 and 13, the battery element 20 is contained inside the battery can 11, and an end of the cathode lead 25 is welded to the safety valve mechanism 15, and an end of the anode lead 26 is welded to the battery can 11. Further, the foregoing electrolytic solution is injected into the battery can 11, and the separator 23 is impregnated therewith. Finally, the battery cover 14, the safety valve mechanism 15, and the PTC device 16 are fixed at the open end of the battery can 11 by being caulked with the gasket 17. Thereby, the secondary battery illustrated in FIG. 1 and FIG. 2 is completed.

As described above, according to the secondary battery of this embodiment, in the anode 22, the anode active material layer 22B is provided to occupy the opposed region 22C1 that is opposed to and is layered on the coated region 21C and the peripheral region 22C2. Thus, the following advantages are able to be obtained. That is, in charging, current concentration (flow of lithium ions) in an edge 22T in the longitudinal direction in the anode active material layer 22B (refer to part (C) and part (D) of FIG. 3) and in the vicinity thereof is relaxed. In the result, precipitation of lithium metal in the anode 22 is inhibited, and short circuit with the cathode 21 is prevented. Further, in case conductive foreign matters such as metal powder are mixed in the battery, dissolution and precipitation in the anode 22 of the conductive foreign matters are inhibited and thereby local concentration of lithium ions is relaxed, and short circuit with the cathode 21 is prevented. Further, since the width W3 of the exposed region 22D is smaller than the width W4 of the opposed region 22C1 that is opposed to and is layered on the coated region 21C, possibility of short circuit generation in the case where conductive foreign matters such as metal powder are mixed in the battery is further decreased for the following reason. That is, a gap resulting from a step generated due to the thickness of the anode active material layer 22 provided on the anode current collector 22A (space surrounded by the anode current collector 22A, the anode active material layer 22, and the separator 23) is decreased, and in particular, such a gap does not exist in both ends in the width direction (Y direction) of the battery element 20. In general, it is highly possible that the conductive foreign matters are generated in performing shape processing of the aperture end of the battery can 11 (forming a constricted part of the battery can 11) or in welding the end of the cathode lead 25 to the safety valve mechanism 15 in a manufacturing stage. The conductive foreign matters generated as above intrude from both ends in the width direction of the battery element 20 to the foregoing gap together with the electrolytic solution subsequently injected into the battery can 11. In this case, if a gap does not exist on both ends in the width direction (Y direction) of the battery element 20 as in this embodiment, the conductive foreign matters hardly intrudes into a gap remaining in the center of the width direction (Y direction), and possibility of short circuit generation becomes significantly low.

As described above, according to the secondary battery of this embodiment, in the anode 22, the anode active material layer 22B is provided to correspond to all area of the coated region 21C on which the cathode active material layer 21B is formed. In addition, the width W3 of the exposed region 22D is smaller than the width W4 of the opposed region 22C1. Thus, even if an action such as coating the exposed region 21D of the cathode 21 with an insulative tape or the like is not taken, generation of internal short circuit associated with charge is able to be sufficiently inhibited. However, short circuit may be prevented more securely by taking an action such as coating the exposed region 21D of the cathode 21 with an insulative tape or the like. Further, in this embodiment, in the cathode 21, the width W1 of the exposed region 21D is smaller than the width W2 of the coated region 21C. Thus, generation of internal short circuit is able to be more effectively inhibited. In the case where the exposed region 21D of the cathode 21 is covered with an insulative tape or the like, by setting the width W1 of the exposed region 21D to a smaller value than that of the width W2 of the coated region 21C, intrusion of conductive foreign matters from the end of the width direction of the cathode 21 to the vicinity of the edge in the longitudinal direction in the cathode active material layer 21B is able to be more effectively inhibited.

Further, in this embodiment, the width W1 of the exposed region 21D is smaller than the width W2 of the coated region 21C in the cathode 21, and the width W3 of the exposed region 22D is smaller than the width W4 of the opposed region 22C1 in the anode 22. However, as long as the width W3 is smaller than the width W4 at least in the anode 22, certain effect is able to be obtained even if the width W1 is a value equal to the width W2 in the cathode 21.

Further, in this embodiment, both the width W3 of the exposed region 22D located on the center side of the spirally wound battery element 20 and the width W3 of the exposed region 22D located on the center side of the outer circumference of the spirally wound battery element 20 are smaller than the width W4 of the opposed region 22C1 in the anode 22. Thus, generation of internal short circuit is able to be more effectively inhibited. However, as long as only the width W3 of one of the exposed regions 22D is smaller than the width W4 of the opposed region 22C1, certain effect is able to be obtained even if the width W3 of the other one of the exposed regions 22D is a value equal to the width W4. The same is applied to the cathode 21.

EXAMPLES

Examples of the invention will be described in detail.

Examples 1-1 to 1-8

The cylinder-type secondary batteries described in the foregoing embodiment (FIG. 1 and FIG. 2) were fabricated. First, lithium carbonate ($Li_2CO_3$) and cobalt carbonate ($CoCO_3$) were mixed at a ratio of $Li_2CO_3$:$CoCO_3$=0.5:1 (molar ratio). The mixture was fired for 5 hours at 900 deg C. in the air to obtain lithium cobalt complex oxide ($LiCoO_2$) as a cathode active material. Next, 91 parts by mass of the lithium cobalt complex oxide, 6 parts by mass of graphite as a conductive agent, and 3 parts by mass of polyvinylidene fluoride as a binder were mixed to prepare a cathode mixture. Subsequently, the cathode mixture was dispersed in N-methyl-2-pyrrolidone as a solvent to form cathode mixture slurry. Both faces of the cathode current collector 21A made of an aluminum foil being 15 μm thick were uniformly coated with the cathode mixture slurry, which was subsequently dried. The resultant was compression-molded by a rolling press machine to form the cathode active material layer 21B, and thereby the cathode 21 was formed. At this time, the pair of exposed regions 21D were provided on both ends in the longitudinal direction of the cathode 21, and the cathode lead 25 made of aluminum was attached to the cathode current collector 21A in one of the exposed regions 21D by welding. In the examples, both the width W1 of the exposed region and the width W2 of the coated region 21C were 56.0 mm.

Next, the anode 22 was formed as follows. Specifically, first, an amorphous silicon thin film containing oxygen with 4 at % was evaporated to become a thickness of 6 micron by electron beam evaporation method on both faces of the anode current collector 22A made of an electrolytic copper foil. As the electrolytic copper foil, a foil that has a thickness of 15 μm and has a surface roughness Rz value of 3.5 μm was used. After that, the amorphous silicon thin film was provided with heat treatment for 12 hours at 250 deg C. in argon atmosphere, and thereby the anode active material layer 22B was obtained. At that time, the anode active material layer 22B was selectively formed on the anode current collector 22A, and thereby the pair of exposed regions 22D were provided on both ends in the longitudinal direction of the anode 22, and both ends in the width direction of one of the exposed regions 22D (located on the outer circumference side of the spirally wound body) were cut and removed to form the anode 22. At that time, both ends in the width direction of the peripheral region 22C2 were also cut and moved so that the width W3 of the exposed region 22D became almost constant. The peripheral region 22C2 was cut so that the width was decreased continuously as the position thereof was distanced from the opposed region 22C1. The width W4 of the coated region 22C was constant. The width W3 of the exposed region 22D and the width W4 of the coated region 22C were respectively as illustrated in Table 1. After that, the anode lead 26 made of nickel was attached to the anode current collector 22A of the exposed region 22D with both ends in the width direction cut and removed by welding.

Subsequently, the separator 23 made of a micro porous polypropylene film being 20 μm thick was prepared. The cathode 21, the separator 23, the anode 22, and the separator 23 were sequentially layered to form a laminated body. After that, the laminated body was spirally wound several times to form the battery element 20.

After the battery element 20 was formed, the battery element 20 was sandwiched between the pair of insulating plates 12 and 13, the anode lead 26 was welded to the battery can 11, the cathode lead 25 was welded to the safety valve mechanism 15, and the battery element 20 was contained inside the battery can 11 being 13.4 mm in internal diameter. After that, 0.5 mg of iron powder filtrated through a 150 mesh screen was sprinkled on the battery element 20 and injected into the battery can 11. Further, an electrolytic solution was injected into the battery can 11. As the electrolytic solution, a solution obtained by dissolving 1 mol/dm$^3$ of $LiPF_6$ as an electrolyte salt in a mixed solvent of 50 volume % of ethylene carbonate and 50 volume % of diethyl carbonate was used.

After the electrolytic solution was injected into the battery can 11, the battery cover 14 was fixed by being caulked through the gasket 17. In the result, the cylinder-type battery being 18 mm in external diameter and being 65 mm high was obtained.

Example 1-9

A cylinder-type secondary battery illustrated in FIG. 1 and FIG. 2 was fabricated in the same manner as that of the foregoing Examples 1-1 to 1-8, except that both ends in the width direction of the exposed region 22D were not cut and not removed. That is, in Example 1-9, the width W3 of the exposed region 22D is identical with the width W4 of the coated region 22C in the anode 22.

For the secondary batteries of Examples 1-1 to 1-9 obtained as above, safety evaluation test was performed as follows. First, constant current and constant voltage charge was performed for 5 hours at the upper limit voltage of 4.2 V, at a current of 0.5 C., and at 23 deg C. After that, constant current discharge was performed at a current of 0.5 C and at a final voltage of 3.0 V. After that, the secondary battery provided with the foregoing charge and discharge was disassembled, the exposed region 21D of the cathode 21 and the exposed region 22D of the anode 22 were visually observed, and presence of short circuit trace on the surface of the cathode current collector 21A and the anode current collector 22A was checked. In that case, if at least one short circuit trace exists on the surface of the cathode current collector 21A and the anode current collector 22A, such a case was judged as generation of short circuit. The number of samples (n) for each example was 10. The results are illustrated in Table 1.

TABLE 1

Anode active material: Si (electron beam evaporation method)

| Table 1 | Width of opposed region W4 (mm) | Width of exposed region W3 (mm) | W4 − W3 | (W4 − W3)/W3 | Number of short circuit generation |
|---|---|---|---|---|---|
| Example 1-1 | 58.0 | 57.9 | 0.1 | 0.002 | 9/10 |
| Example 1-2 | 58.0 | 57.7 | 0.3 | 0.005 | 6/10 |
| Example 1-3 | 58.0 | 57.0 | 1.0 | 0.017 | 5/10 |
| Example 1-4 | 58.0 | 55.0 | 3.0 | 0.052 | 4/10 |
| Example 1-5 | 58.0 | 53.0 | 5.0 | 0.086 | 3/10 |
| Example 1-6 | 58.0 | 51.0 | 7.0 | 0.121 | 4/10 |
| Example 1-7 | 58.0 | 49.0 | 9.0 | 0.155 | 3/10 |
| Example 1-8 | 58.0 | 47.0 | 11.0 | 0.190 | 2/10 |
| Example 1-9 | 58.0 | 58.0 | 0.0 | 0.000 | 10/10 |

As illustrated in Table 1, in Examples 1-1 to 1-8 in which the width W3 was smaller than the width W4 (satisfying W4>W3), the number of short circuit generation was able to be decreased more than in Example 1-9 in which the width W3 was equal to the width W4 (W4=W3). In particular, in the case where a value (W4−W3)/W3 was 0.005 or more, short circuit was able to be effectively inhibited.

Example 2-1

A cylinder-type secondary battery was fabricated in the same manner as that of Example 1-3, except that both ends in the width direction of the pair of exposed regions 22D were cut and removed and thereby the anode 22 was formed. Width W3-1 of the exposed region 22D on the center side of the spirally wound body and width W3-2 of the exposed region on the outer circumference side of the spirally wound body were as illustrated in Table 2, respectively.

For the secondary battery of Example 2-1, similar safety evaluation test was performed. The results are illustrated in Table 2 together with the result of Example 1-3.

TABLE 2

Anode active material: Si (electron beam evaporation method)

| Table 2 | Width of opposed region W4 (mm) | Width of exposed region on center side of spirally wound body W3 − 1 (mm) | Width of exposed region on outer circumference side of spirally wound body W3 − 2 (mm) | Number of short circuit generation |
|---|---|---|---|---|
| Example 1-3 | 58.0 | 58.0 | 57.0 | 5/10 |
| Example 2-1 | 58.0 | 57.0 | 57.0 | 4/10 |

As illustrated in Table 2, the number of short circuit generation was able to be decreased more by setting the width of the coated region on the center side of the spirally wound body to a smaller value than that of the opposed region in addition to setting the width of the coated region on the outer circumference side of the spirally wound body to a smaller value than that of the opposed region.

Examples 3-1 to 3-8

Cylinder-type secondary batteries were fabricated in the same manner as that of Example 2-1, except that in forming the cathode 21, both ends in the width direction of the pair of exposed regions 21D were cut and removed and thereby the width W1 of one of the pair of exposed regions 21D was smaller than the width W2 of the coated region 21C. However, both ends in the width direction were cut so that the width W1 of the exposed regions 21D was decreased continuously as the position thereof is distanced from the coated region 21C in the vicinity of the interface where the exposed region 21D was connected with the coated region 21C (distance L1=distance V1). In a region other than the vicinity of the interface, the width W1 was constant. The width W2 of the coated region 21C was also constant. The widths W1 and W2 are as illustrated in Table 3, respectively.

For the secondary batteries of Examples 3-1 to 3-8, similar safety evaluation test was performed. Further, for the secondary batteries of the respective examples, each number of heat generation was compared to each other. Specifically, charging was performed under the same conditions as those of the foregoing safety evaluation test. Charged secondary batteries were left at 23 deg C. for 1 hour. After that, the number of secondary batteries in which the surface temperature of the battery can 11 reached 35 deg C, or more was counted. The results are illustrated in Table 3 together with the results of Examples 1-9 and 2-1.

TABLE 3

Cathode active material: LiCoO₂, anode active material: Si (electron beam evaporation method)

| Table 3 | Cathode | | | | Anode | | Number of short circuit generation | Number of heat generation |
|---|---|---|---|---|---|---|---|---|
| | Width W2 (mm) | Width W1 (mm) | W2 − W1 | (W2 − W1)/W2 | Width W4 (mm) | Width W3 (mm) | | |
| Example 1-9 | 56.0 | 56.0 | 0.0 | 0 | 58.0 | 58.0 | 10/10 | 8/10 |
| Example 2-1 | 56.0 | 56.0 | 0.0 | 0 | 58.0 | 57.0 | 4/10 | 2/10 |
| Example 3-1 | 56.0 | 55.9 | 0.1 | 0.002 | 58.0 | 57.0 | 3/10 | 1/10 |
| Example 3-2 | 56.0 | 55.7 | 0.3 | 0.005 | 58.0 | 57.0 | 2/10 | 1/10 |
| Example 3-3 | 56.0 | 55.0 | 1.0 | 0.018 | 58.0 | 57.0 | 1/10 | 1/10 |
| Example 3-4 | 56.0 | 53.0 | 3.0 | 0.054 | 58.0 | 57.0 | 1/10 | 1/10 |
| Example 3-5 | 56.0 | 51.0 | 5.0 | 0.089 | 58.0 | 57.0 | 1/10 | 1/10 |
| Example 3-6 | 56.0 | 49.0 | 7.0 | 0.125 | 58.0 | 57.0 | 1/10 | 1/10 |
| Example 3-7 | 56.0 | 48.0 | 8.0 | 0.143 | 58.0 | 57.0 | 1/10 | 1/10 |
| Example 3-8 | 56.0 | 47.0 | 9.0 | 0.161 | 58.0 | 57.0 | 1/10 | 1/10 |

As illustrated in Table 3, in Examples 3-1 to 3-8, the width W3 of the exposed region 22D was smaller than the width W4 of the opposed region 22C1 in the anode 22, and the width W1 of the exposed region 21D was smaller than the width W2 of the coated region 21C in the cathode 21. Thus, the number of short circuit generation and the number of heat generation were able to be decreased more than in Example 1-9 and example 2-1. In particular, in the case where a value (W2−W1)/W2 was 0.005 or more, short circuit was able to be effectively inhibited.

Examples 4-1 and 4-2

Cylinder-type secondary batteries were fabricated in the same manner as that of Examples 3-1 and 1-9, except that the anode active material layer 22B made of tin (Sn) was formed by electron beam evaporation method in forming the anode 22.

Examples 5-1 and 5-2

Cylinder-type secondary batteries were fabricated in the same manner as that of Examples 3-1 and 1-9, except that the anode 22 was formed as follows.

Specifically, first, spherical artificial graphite having an average particle diameter of 25 μm, acetylene black, and polyvinylidene fluoride as a binder were mixed at a weight ratio of 90:30:7 to prepare an anode mixture. Subsequently, the anode mixture was dispersed in N-methyl-2-pyrrolidone as a solvent to obtain an anode mixture slurry. Both faces of the anode current collector 22A made of an electrolytic copper foil were selectively coated with the anode mixture slurry and the resultant was dried. As the electrolytic copper foil, a foil that had a thickness of 15 μm and had a surface roughness Ra value of 0.3 μm was used. After drying, the resultant was press-molded by a rolling press machine, and thereby the anode active material layer 22B was formed.

For the secondary batteries of Examples 4-1 and 4-2 and Examples 5-1 and 5-2, safety evaluation test was performed. The results are illustrated in Table 4 together with the result of Example 3-3.

TABLE 4

Cathode active material: LiCoO₂

| Table 4 | Anode | Cathode | | Anode | | Number of short circuit generation |
|---|---|---|---|---|---|---|
| | | Width of coated region W2 (mm) | Width of exposed region W1 (mm) | Width of opposed region W4 (mm) | Width of exposed region W3 (mm) | |
| Example 3-3 | Si (evaporation) | 56.0 | 55.0 | 58.0 | 57.0 | 1/10 |
| Example 4-1 | Sn (evaporation) | 56.0 | 55.0 | 58.0 | 57.0 | 2/10 |
| Example 4-2 | Sn (evaporation) | 56.0 | 56.0 | 58.0 | 58.0 | 9/10 |
| Example 5-1 | Graphite (coating) | 56.0 | 55.0 | 58.0 | 57.0 | 3/10 |
| Example 5-2 | Graphite (coating) | 56.0 | 56.0 | 58.0 | 58.0 | 5/10 |

As illustrated in Table 4, in the case where the component material and the formation method of the anode active material layer 22B were changed, tendency similar to that of the case that the anode active material layer 22B made of silicon (Si) was formed by electron beam evaporation method was able to be confirmed as well.

Example 6-1

A cylinder-type secondary battery was fabricated in the same manner as that of Example 3-1, except that values of the widths W1 and W3 were respectively 49.0 nm and 51.0 mm.

Example 6-2

Figure 4:
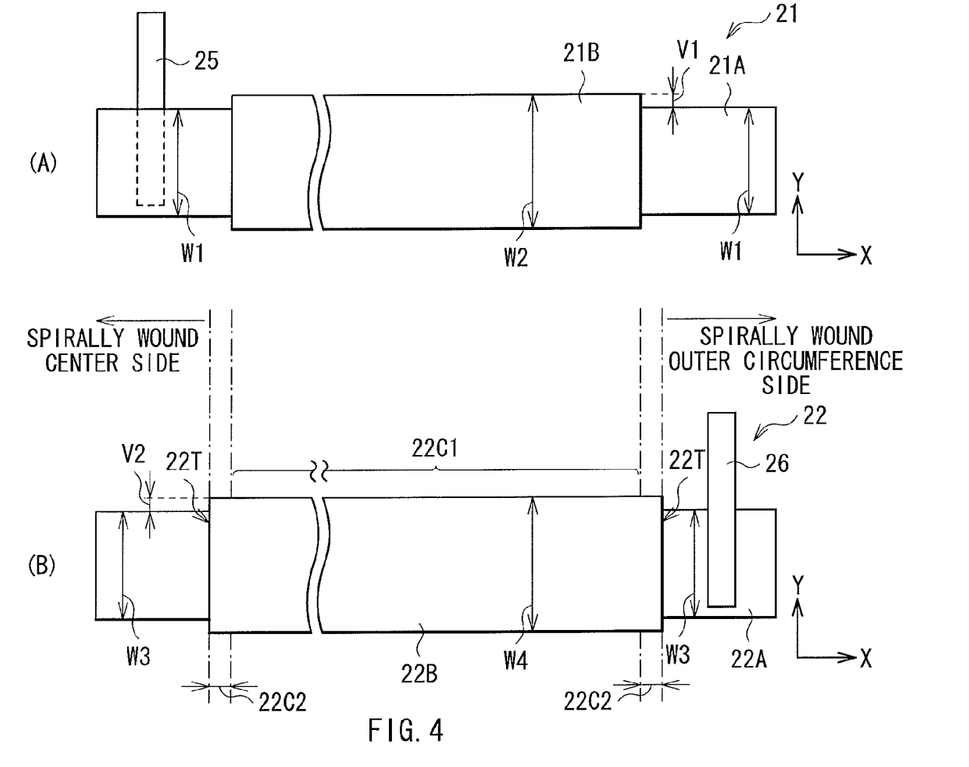
FIGS. 4A and 4B are plan views of an exploded cathode and an exploded anode corresponding to Example 6-2.

A cylinder-type secondary battery was fabricated in the same manner as that of Example 6-1, except that the planar shapes of the exploded cathode 21 and the exploded anode 22 were as illustrated in FIG. 4A and FIG. 4B, respectively. In this example, as illustrated in FIG. 4A and FIG. 4B, the exposed regions 21D and 22D have the constant widths W1 and W2 in the vicinity of the interface with the coated regions 21C and 22C. That is, the outlines of the cathode current collector 21A and the anode current collector 22A are bent in the interface between the coated region and the exposed region.

For the secondary batteries of Examples 6-1 and 6-2, each number of crack generation was compared to each other. Specifically, the secondary battery provided with the foregoing safety evaluation test was disassembled, the exposed regions 21D and 22D of the cathode 21 and the anode 22 were visually observed, respectively, and presence of crack and fracture in the cathode current collector 21A and the anode current collector 22A were checked. In this case, if at least one crack/fracture exists in the cathode current collector 21A and the anode current collector 22A, such a case was counted. The number of samples (n) for each example was 10. The results are illustrated in Table 5.

TABLE 5

Cathode active material: LiCoO$_2$, anode active material: Si (electron beam evaporation method)

| Table 5 | Planar shape of anode | Cathode Width of coated region W2 (mm) | Cathode Width of exposed region W1 (mm) | Anode Width of opposed region W4 (mm) | Anode Width of exposed region W3 (mm) | Number of crack generation |
|---|---|---|---|---|---|---|
| Example 6-1 | FIG. 3 | 56.0 | 49.0 | 58.0 | 51.0 | 0/10 |
| Example 6-2 | FIGS. 4A and 4B | 56.0 | 49.0 | 58.0 | 51.0 | 1/10 |

As illustrated in Table 5, a secondary battery in which a crack was generated was confirmed in Example 6-2, while no crack was generated in Example 6-1. Accordingly, it was found that in the case where the widths W1 and W3 of the exposed regions 21D and 22D were decreased continuously as the position thereof was distanced from the coated regions 21C and 22C in the vicinity of the interface where the exposed regions 21D and 22D were connected with the coated regions 21C and 22C, crack generation was effectively prevented.

The invention has been described with reference to the embodiment and the examples. However, the invention is not limited to the foregoing embodiment and the foregoing examples, and various modifications may be made. For example, in the foregoing embodiment and the foregoing examples, the descriptions have been given of the case that the battery can is a cylinder-type. However, the invention is not limited thereto, but is applied to a battery including, for example, a square-type battery can other than the cylinder-type battery can.

Further, in the foregoing embodiment and the foregoing examples, the description has been given of the case using lithium as an electrode reactant. However, the invention is able to be applied to a case in which other Group 1 element in the long periodic table such as sodium (Na) and potassium (K), a Group 2 element in the long periodic table such as magnesium and calcium (Ca), other light metal such as aluminum, or an alloy of lithium or the foregoing elements is used, and similar effect is able to be obtained. In this case, an anode active material and a cathode active material capable of inserting and extracting an electrode reactant, a solvent and the like are selected according to the electrode reactant.

The present application contains subject matter related to that disclosed in Japanese Priority Patent Application JP 2009-280752 filed in the Japanese Patent Office on Dec. 10, 2009, the entire contents of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A battery comprising:
   a cathode comprising (1) a strip-shaped cathode current collector, having a first region and two second regions, the first region in-between the second regions, and (2) a cathode active material layer on the first region of the strip-shaped cathode current collector,
   an anode comprising (1) a strip-shaped anode current collector, having a first region, two second regions, and two third regions, the first region in-between the second regions, and the second regions in-between the third regions, and (2) an anode active material layer on the first region and second regions of the strip-shaped anode current collector, and
   a separator in between the cathode and the anode,
   wherein,
      the first region of the strip-shaped cathode current collector covers substantially the same area as the first region of the strip-shaped anode current collector, and
      the relationship between a width of the first region of the strip-shape anode current collector, A, and a width of each third region, B, is $0.005 \leq (A-B)/A \leq 0.15$.

2. The battery according to claim 1, wherein both edges of the third region are recessed from the edges of the first region of strip-shaped anode current collector.

3. The battery according to claim 1, a width of each second region of the strip-shape cathode current collector is smaller than a width of the first region of the strip-shape current collector.

4. The battery according to claim 3, wherein the relationship between the width of the first region of the strip-shape current collector, C, and the width of each second region of the strip-shape cathode current, D is $0.005 \leq (C-D)/C \leq 0.15$.

5. The battery according to claim 1, wherein the width of each third region of strip-shaped anode current collector is decreased continuously as position thereof is distanced from the first region of strip-shaped anode current collector.

6. The battery according to claim 1, wherein the anode active material layer contains at least one of tin (Sn) and silicon (Si).

7. A battery comprising:
a cathode comprising (1) a strip-shaped cathode current collector, having a first region and two second regions, the first region in-between the second regions, and (2) a cathode active material layer on the first region of the strip-shaped cathode current collector,
an anode comprising (1) a strip-shaped anode current collector, having a first region, two second regions, and two third regions, the first region in-between the second regions, and the second regions in-between the third regions, and (2) an anode active material layer on the first region and second regions of the strip-shaped anode current collector, and
a separator in between the cathode and the anode, wherein,
the first region of the strip-shaped cathode current collector covers substantially the same area as the first region of the strip-shaped anode current collector, and
the relationship between a width of the first region of the strip-shape current collector, C, and a width of each second region of the strip-shape cathode current, D is $0.005 \leq (C-D)/C \leq 0.15$.

* * * * *